(12) United States Patent
Ohmi (10) Patent No.: US 6,972,674 B2
(45) Date of Patent: Dec. 6, 2005

(54) LIGHTING DEVICE FOR VEHICLE (75) Inventor: Takeshi Ohmi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 319 days.

(21) Appl. No.: 10/447,070

(22) Filed: May 28, 2003

(65) Prior Publication Data

US 2003/0226954 A1 Dec. 11, 2003

(30) Foreign Application Priority Data

Jun. 5, 2002 (JP) ........................ P. 2002-164281

(51) Int. Cl.[7] ............................................. B60Q 11/00
(52) U.S. Cl. .................... 340/458; 340/461; 340/475; 340/641; 315/77
(58) Field of Search .................. 340/458, 461, 340/475, 479, 507, 815.45, 635, 641, 642, 340/657, 664; 315/77, 129, 131–133

(56) References Cited

U.S. PATENT DOCUMENTS

| 4,910,496 | A | * | 3/1990 | Hatanaka et al. .......... 340/458 |
| 5,095,502 | A | * | 3/1992 | Finzel ......................... 379/40 |
| 5,801,623 | A | * | 9/1998 | Chen et al. .................. 340/458 |
| 5,955,945 | A | * | 9/1999 | Fuhrer ......................... 340/479 |
| 6,157,296 | A | * | 12/2000 | Endoh .......................... 340/458 |
| 6,396,466 | B1 | | 5/2002 | Pross et al. .................... 345/82 |
| 6,441,730 | B1 | * | 8/2002 | Magruder .................... 340/458 |
| 6,542,082 | B1 | * | 4/2003 | Nowka et al. .............. 340/635 |
| 6,844,681 | B2 | * | 1/2005 | Serizawa et al. ............. 315/77 |

* cited by examiner

Primary Examiner—Toan N. Pham
(74) Attorney, Agent, or Firm—Fish & Richardson P.C.

(57) ABSTRACT

A lighting device 1 for a vehicle comprises a lighting unit having such a structure that a light emitting unit 9 including a set of light emitting elements 9a, 9a, . . . is connected in parallel. In the case in which the breakage of the light emitting unit is detected by first breakage detecting means 10A, the generation of the breakage related to the light emitting unit is displayed by display means 11. In the case in which the generation of the breakage of at least a predetermined number of light emitting units is detected by second breakage detecting means 10B, an alarm is given by flashing a light emitting unit in which the breakage is not detected or a lighting unit including only the light emitting unit in a shorter flashing cycle than a flashing cycle obtained before the detection of the breakage.

6 Claims, 6 Drawing Sheets

LIGHTING DEVICE FOR VEHICLE

BACKGROUND OF THE INVENTION

The present invention relates to a technique for the detection of the breakage of a light emitting element and power feeding control in a lighting device for a vehicle using a light emitting element group.

Examples of a lighting unit for a vehicle for repeating flashing in a predetermined cycle includes a turn signal lamp. Detection of a breakage is legally required in such a manner that a vehicle driver can easily grasp an operation state thereof. For example, a relay flasher circuit includes a breakage detecting function related to an incandescent lamp and a decrease in the value of a current flowing to the incandescent lamp is detected to decide the presence of a breakage.

A lighting unit using a light emitting element such as an LED (a light emitting diode) as a light source other than the incandescent lamp is required in respect of a reduction in a thickness and power saving or the needs of a design. In the case in which the light emitting element is used, a configuration in which light emitting units having sets of plural light emitting elements are connected in parallel with each other is employed. Accordingly, since detection of the breakage of the plural light emitting elements is different from that of one electric bulb, technique for the incandescent lamp cannot be used. The detection of a breakage related to a plurality of light emitting units is required and the following method can be employed, for example.

(1) A method of detecting a current flowing to each light emitting unit, thereby deciding whether a breakage is generated or not, and (2) a method of deciding that a breakage is generated in a whole lamp when detecting that the total value of a current flowing to each light emitting unit is smaller than a predetermined reference value.

In the method (1), the detection of a breakage can be carried out for each light emitting unit. For this reason, in the case in which the breakage is detected in at least one light emitting unit, for example, it is possible to inform a vehicle driver of the generation of a breakage through the high-speed flashing operation of a flashing circuit.

In the method (2), moreover, in the case in which a large number of light emitting elements constituting the light emitting unit are broken and a necessary brightness for a lamp (a specific light amount defined by regulations) is not satisfied, it is possible to inform a vehicle driver of the generation of the breakage through the high-speed flashing operation of a flashing circuit.

However, the conventional structure has the following problems in relation to the precision and time of the detection of the breakage.

First of all, in the method (1), in the case in which the breakage is detected for a certain light emitting unit, precision is high in that an alarm of a breakage abnormality can be immediately given. On the other hand, there is a possibility that a breakage detecting circuit might have sensitive effect (the generation of a malfunction might be caused). Although the amount of light of the whole lamp fully satisfies a specific light amount determined by regulations, moreover, it is decided that the breakage of the whole lamp is generated based on the detection of the breakage of a small number of light emitting units.

On the other hand, in the method (2), in the case in which the amount of light of the whole lamp is smaller than the specific light amount, it is decided that the breakage is generated. Therefore, a detection sensitivity is lower as compared with the method (1). Accordingly, a vehicle driver is not informed of the generation of a breakage related to individual light emitting units until a large number of light emitting units stop functioning due to the breakage. As a result, there is a possibility that a countermeasure such as a repair might be taken with a delay.

SUMMARY OF THE INVENTION

Therefore, it is an object of the invention to detect the generation of a breakage at an early stage and to practically use an unbroken light emitting element as long as a necessary amount of light for a lighting unit is maintained in a lighting device for a vehicle using a plurality of light emitting elements.

The invention provides a lighting device for a vehicle having a lighting unit in which a plurality of light emitting elements make a set to constitute a light emitting unit and the light emitting units are connected in parallel with each other, the lighting device having the following structure.

There is provided first breakage detecting means for detecting a breakage of the light emitting element constituting the light emitting unit for each of the light emitting units.

There is provided second breakage detecting means for detecting whether a breakage of at least a predetermined number of light emitting units is generated or not.

When the breakage of the light emitting element constituting the light emitting unit is detected by the first breakage detecting means, the generation of the breakage related to the light emitting unit is displayed. When the generation of the breakage of the at least a predetermined number of light emitting units is detected by the second breakage detecting means, the control means flashes a light emitting unit in which the breakage is not detected or a lighting unit including only the light emitting unit in a shorter flashing cycle than a flashing cycle obtained before the detection of the breakage.

According to the invention, therefore, in the case in which the breakage of the light emitting element constituting a certain light emitting unit is detected, the generation of the breakage is displayed so that a vehicle driver can be informed of the generation of the breakage at an early stage. In the case in which the generation of the breakage of at least a predetermined number of light emitting units is detected, the flashing is carried out in a shorter flashing cycle than the flashing cycle obtained before the detection of the breakage. Consequently, it is possible to give an alarm indicative of the generation of an abnormality in the whole lighting unit having the light emitting unit (including a reduction in the amount of light which is smaller than a specific light amount).

DETAILED DESCRIPTION OF THE PREFERRED EMBODIMENTS

The invention relates to a lighting device for a vehicle using a light emitting element group as a light source and comprises a lighting unit including a light emitting unit having a set of light emitting elements and connected in parallel. For example, the invention can be applied to a turn signal lamp for an automobile.

Figure 1:
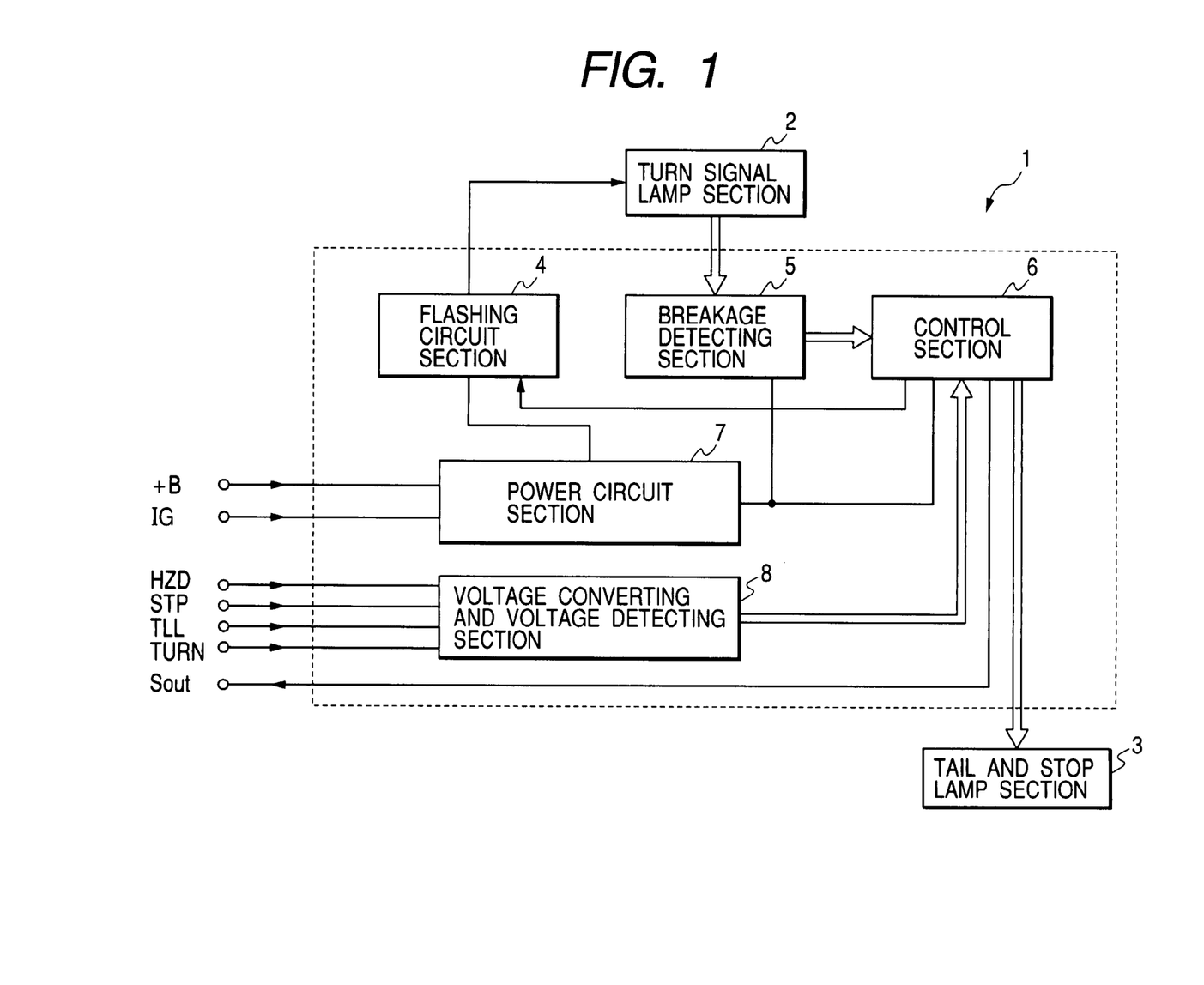
FIG. 1 is a circuit block diagram showing an example of a basic structure according to the invention.

FIG. 1 shows an example of the basic structure of a circuit according to the invention, and the circuit can be applied to an electronic control unit (ECU) having a flasher function and a breakage detecting function.

In the example, there is described a structure in which flashing and lighting are controlled including a turn signal lamp and a tail and stop lamp. A lighting device 1 for a vehicle comprises the following components (numerals in parentheses indicate designations).

Turn signal lamp section (2), tail and stop lamp section (3), flashing circuit section (4), breakage detecting section (5), control section (6), power circuit section (7), and voltage converting and voltage detecting section (8).

Each of symbols in the drawings has the following meaning.

"+B"=a battery voltage (12V is always input. An input voltage for operating a circuit when a hazard switch is ON), "IG"=an ignition voltage (an input voltage for operating the circuit in an ON state brought by a key operation), "HZD"=a hazard input signal (turned ON at an Lo level voltage (for example : 6V or less)), "STP"=a stop lamp input signal (turned ON at an Lo level voltage (for example: 6V or more)), "TLL"=a tail lamp input signal (turned ON at 6V or more), "TURN"=a turn signal input signal (turned ON at 6V or less), and "Sout"=an output signal for a notice of a breakage.

First of all, the turn signal lamp section 2 is constituted by turn signal lamps (four in all) provided in positions close to both left and right ends in the front and rear parts of a vehicle, respectively. The light source section of each lamp has such a structure that a light emitting unit using a plurality of light emitting elements is connected in parallel and the flashing of the light emitting element is controlled in response to a signal sent from the flashing circuit section 4.

Moreover, the tail and stop lamp section 3 is constituted by a plurality of tail and stop lamps provided in the rear part of the vehicle and an ON/OFF operation is controlled in response to a signal sent from the control section 6. The light source section of the lamp has a configuration using a light emitting element, a configuration using an incandescent lamp or a configuration using both the light emitting element and the incandescent lamp.

The breakage detecting section 5 is provided for detecting the breakage state of the light emitting element group constituting the turn signal lamp section 2 and a result of the detection is sent to the control section 6.

The power circuit section 7 is provided for supplying a necessary voltage to each circuit section upon receipt of the "+B" and the "IG", and serves to supply a power to the flashing circuit section 4, the breakage detecting section 5 and the control section 6.

Moreover, the voltage converting and voltage detecting section 8 carries out a voltage conversion upon receipt of the input signals of HZD, STP, TLL and TURN and then sends the signals to the control section 6 or detects an overvoltage, and sends a result of the detection to the control section 6.

The control section 6 constitutes control means together with the flashing circuit section 4 and serves to control the flashing operation of the turn signal lamp section 2 and to carry out a control processing corresponding to a breakage state related to the light emitting element group constituting the same lamp section. For example, in the case in which the breakage of the light emitting element constituting a certain light emitting unit is detected, the output signal Sout for a breakage notice is sent to display means which is not shown (an indicator or a display lamp) so that the generation of the breakage related to the light emitting unit is displayed. In the case in which it is detected that the breakage of at least a predetermined number of light emitting units is generated, moreover, a control signal for flashing an unbroken light emitting unit or a lighting unit including only the unbroken light emitting unit in a shorter flashing cycle than a flashing cycle obtained before the detection of the breakage is sent to the flashing circuit section 4 to give an alarm of the breakage to a vehicle driver. In addition, the control section 6 serves to control the tail and stop lamp section 3, for example, to switch a function and to control the amount of light correspondingly.

Portions other than the turn signal lamp section 2 and the tail and stop lamp section 3 (see the inside of a square frame shown in a broken line of FIG. 1) are accommodated in the ECU.

Figure 2:
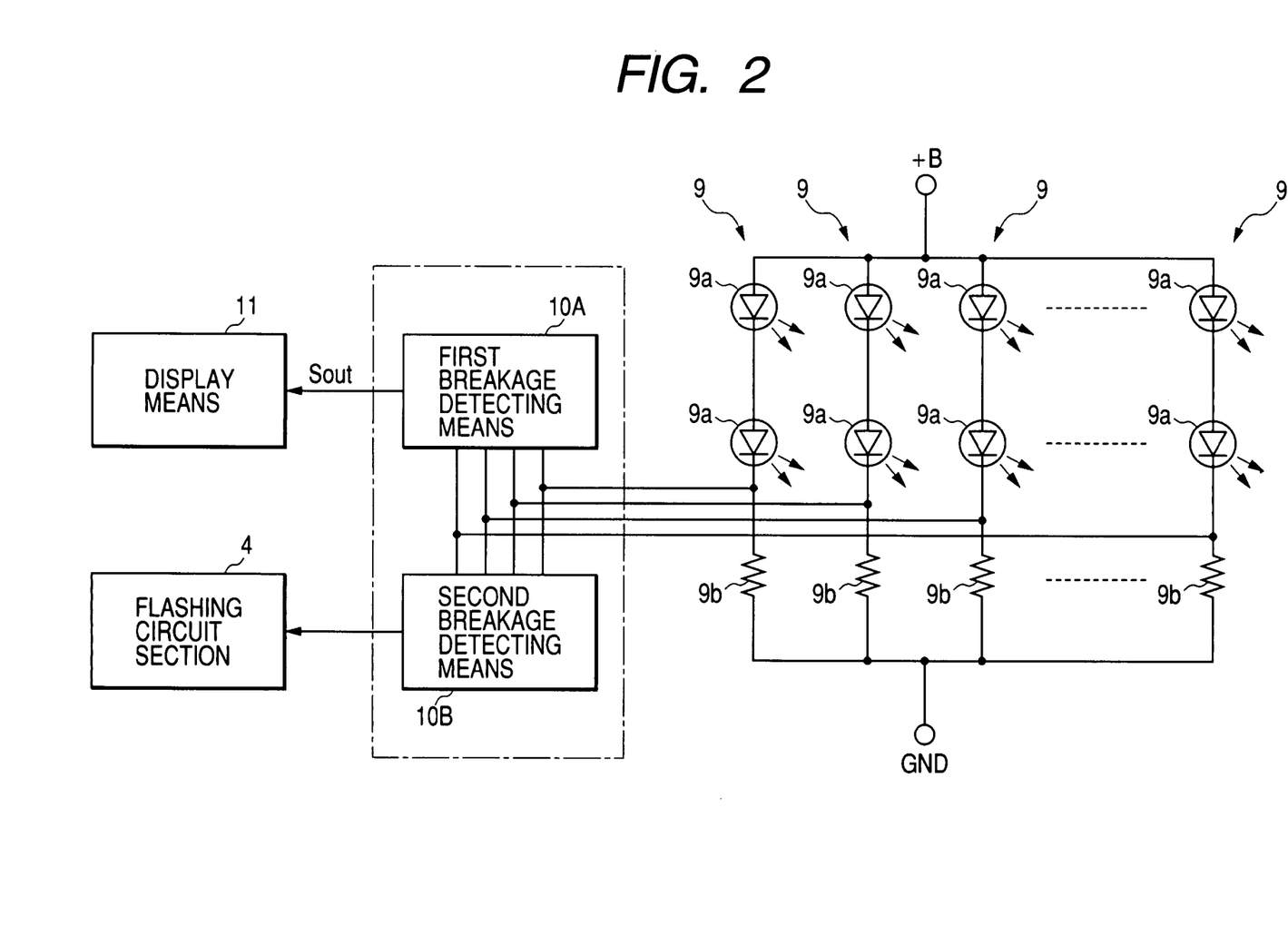
FIG. 2 is a diagram for explaining the detection of a breakage according to the invention.

FIG. 2 is a view for explaining the main part of the breakage detection related to the light emitting unit constituting the turn signal lamp section 2.

Each light emitting unit 9 has such a structure that a plurality of light emitting elements $9a$, $9a$, . . . are connected in series, and the light source section has such a structure that a plurality of light emitting units are connected in parallel with each other. In the example of FIG. 2, two light emitting diodes (LEDs) are connected in series, and furthermore, a "+B" source voltage is supplied to the anode of one of the LEDs and a resistor $9b$ is connected to the cathode of the other LED. A terminal of each resistor $9b$ on the opposite side of a terminal to be connected to the LED is grounded (GND). Thus, one light emitting unit is constituted by a circuit in which a plurality of LEDs and resistors are connected in series, and the light emitting units are connected in parallel with each other.

The following two detecting means are provided for detecting the breakage of the light emitting element constituting each light emitting unit.

(1) First breakage detecting means for detecting the breakage of a light emitting element constituting a light emitting unit for each light emitting unit, and (2) Second breakage detecting means for detecting whether the breakage of at least a predetermined number of light emitting units is generated or not.

First of all, first breakage detecting means 10A is required for detecting a breakage for each light emitting unit and detects that a current does not flow to the light emitting element $9a$ constituting the light emitting unit or a current value is decreased, thereby detecting the presence of the breakage. For example, it is possible to detect the electric potential of a node of the light emitting element $9a$ and the resistor 9b, thereby knowing the generation of the breakage from the level of a detected voltage. In the case in which the breakage of the light emitting element constituting the light emitting unit is detected, the generation of the breakage related to the light emitting unit is displayed to give a notice to a vehicle driver. For example, in the case in which the generation of the breakage is detected, the Sout is sent to display means 11 such as an indicator so that the vehicle driver is informed of the generation of the breakage. Examples of a configuration of breakage display in the display means 11 include a configuration in which the breakage of at least one light emitting unit is displayed by means of a pilot lamp (for example, an OR operation for input signals related to a detected voltage for each light emitting unit is carried out by setting the detected voltage to be H and L binary signals and the presence of the generation of the breakage is displayed based on the result of the operation) and a configuration in which the place of the lighting unit including the broken light emitting element and the position of the light emitting unit are displayed together. Moreover, an alarm sound may be used together.

In the case in which at least a predetermined number of light emitting units are broken, it is hard to maintain a necessary amount of light for the lighting unit. For this reason, second breakage detecting means 10B is provided for detecting that such a situation is generated and giving an alarm to the vehicle driver.

By taking, as an example, a lamp using the LED, a luminous intensity is reduced due to the breakage and aging (deterioration) of the LED. In some cases in which the "breakage" in the breakage detection is defined by "a reduction in the luminous intensity to 50% of an initial value or less", it is necessary to consider a reduction in the luminous intensity which is caused by the aging.

In the case in which it is detected based on the criterion that at least a predetermined number of light emitting units are broken, it is possible to inform the vehicle driver of the generation of an abnormality caused by the breakage through flashing in the light emitting unit in which the breakage is not detected or a lighting unit including only the same light emitting unit in a shorter flashing cycle than a flashing cycle obtained before the detection of the breakage.

Examples of a specific detecting method include a method of calculating the number of the broken light emitting elements or the light emitting units including the same elements based on a current flowing to each light emitting element 9a (a breakage number detecting method) and a method of detecting the total value of a current flowing to each light emitting element (a total current detecting method).

In the former case, for example, the electric potential of the node of the light emitting element 9a and the resistor 9b is detected. It is decided based on the level of the detected voltage whether the breakage of each light emitting unit is generated or not, and the number of the light emitting units including the broken light emitting elements is counted and it is decided whether or not the counted number is equal to or greater than a predetermined number (the number of necessary light emitting units for maintaining the amount of light of the lighting unit). For example, when the breakage of at least three of eight light emitting units in total is detected, the case in which at least five units are normal is set to be a reference (that is, 62.5%=(5/8)×100 in a light amount conversion).

In the total current detecting method, moreover, one of the ends of each resistor 9b is not directly grounded but is connected to a resistor for a current detection and is thus grounded in FIG. 2, for example. By comparing the level of a detection signal detected by a voltage conversion through the resistor for a current detection with a predetermined reference voltage (a reference value corresponding to a necessary specific light amount for the lighting unit), it is possible to decide the generation of the breakage.

In both methods, in the case in which the breakage of a large number of light emitting units is detected and it is hard to maintain a necessary light amount for the lighting unit, a signal is sent to the flashing circuit section 4 so that a flashing instruction signal in a shorter cycle than that in a normal operation (a non-breakage) is sent to a lighting unit including a light emitting unit which is not broken or a pilot lamp, thereby carrying out a high-speed flashing operation (a breakage alarm)

Thus, the light emitting units are connected in parallel with each other. In the case in which the first breakage detecting means 10A detects the breakage of the light emitting element constituting a certain light emitting unit, it is possible to call attention of the vehicle driver early by displaying the generation of the breakage. In the case in which the second breakage detecting means 10B detects the generation of the breakage of at least a predetermined number of light emitting units, it is possible to carry out flashing in a shorter flashing cycle than a flashing cycle obtained before the detection of the breakage, thereby giving the vehicle driver an alarm indicating that an abnormality is generated and a specific light amount cannot be maintained in the whole lighting unit including the light emitting units.

In the case in which the LED is used as the light emitting element, it is preferable that a binary detection should be carried out over a voltage appearing on the resistor 9b connected to the LED in series (that is, the presence of the generation of the breakage should be decided corresponding to the H level or the L level and it is desirable to consider the prevention of the influence of a variation related to Vf (a forward voltage drop) of the individual LED.

FIGS. 3 to 6 show an example of a circuit structure according to the invention.

Figure 3:
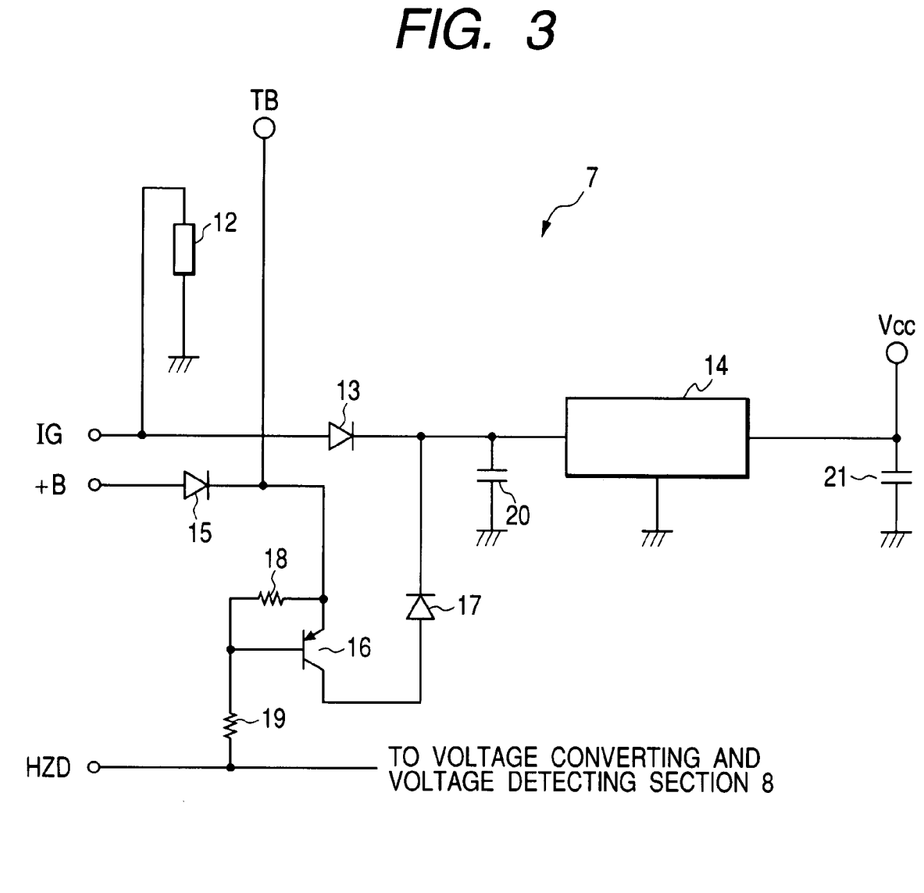
FIG. 3 is a circuit diagram showing an example of a circuit structure together with FIGS. 4 to 6, illustrating an example of the structure of a power circuit section.

FIG. 3 shows an example of the structure of the power circuit section 7.

An ignition voltage IG is supplied to one of the ends of a varistor 12 (a terminal which is not grounded) and the anode of a diode 13. The voltage IG is input to a voltage regulator 14 through the diode 13 in a forward direction seen from the IG. Moreover, a voltage "+B" is supplied to a voltage regulator 14 through a diode 15, a PNP transistor 16 and a diode 17.

The diode 15 has a cathode connected to a terminal "TB" and the emitter of the transistor 16, and the collector of the transistor 16 is connected to the input terminal of the voltage regulator 14 through the diode 17 in a forward direction.

A resistor 18 is provided between the base and emitter of the transistor 16 and the base of the transistor 16 is connected to an HZD signal line through a resistor 19.

Accordingly, "+B" is supplied to the terminal TB during the conduction of the diode 15. In the case in which the level of the HZD is low and the transistor 16 is ON, moreover, the "+B" is input to the voltage regulator 14 through the diode 17.

A 3-terminal regulator is used for the voltage regulator 14, for example, and has an input terminal to which a capacitor 20 is connected and an output terminal to which a capacitor 21 is connected. The terminal voltage of the capacitor 21 is obtained as a source voltage "Vcc".

Figure 4:
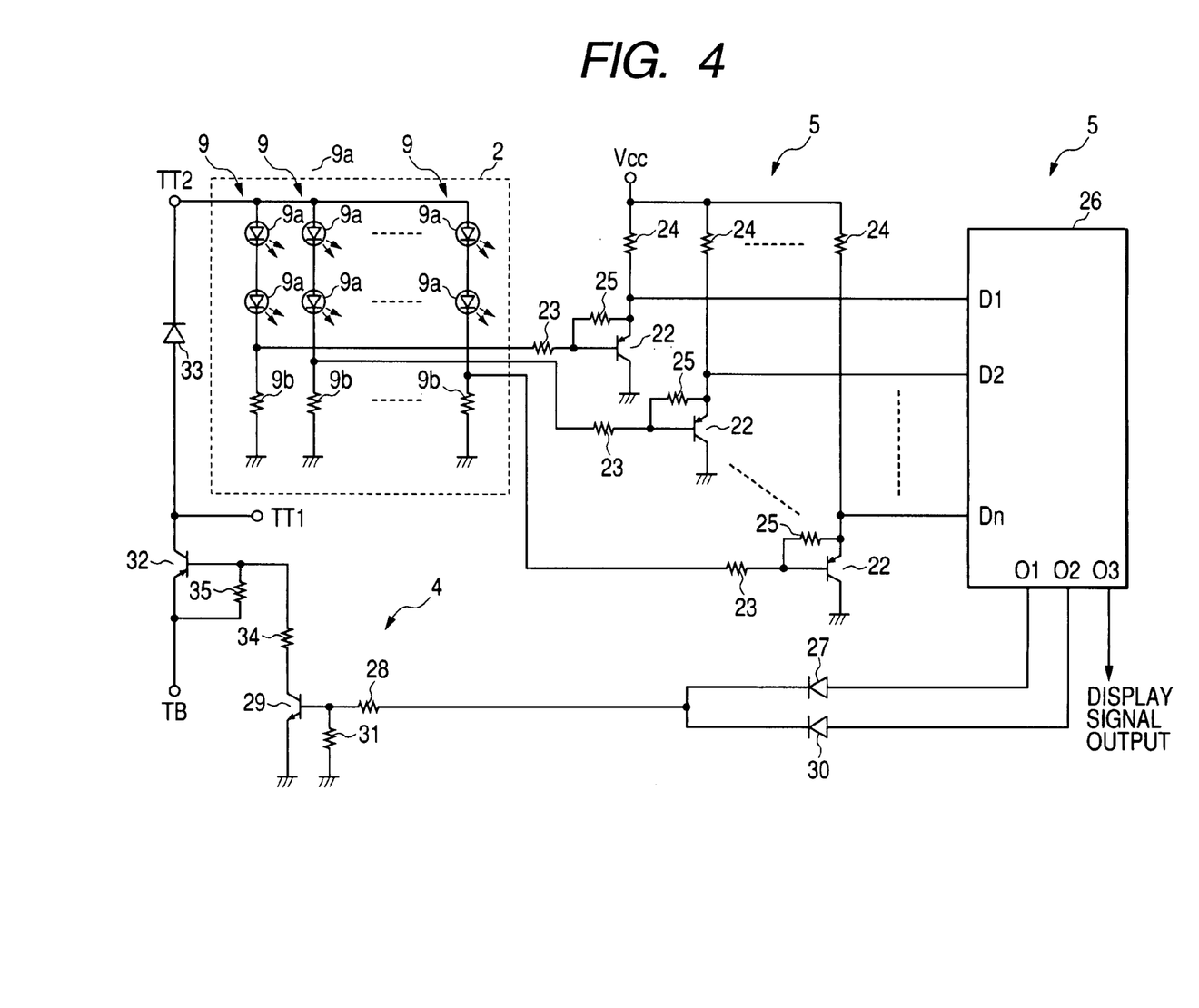
FIG. 4 is a circuit diagram showing the structure of a main part.

FIG. 4 shows an example of the structures of the turn signal lamp section 2, the flashing circuit section 4, the breakage detecting section 5 and the control section 6.

First of all, the turn signal lamp section 2 has such a structure that a plurality of light emitting units 9, 9, . . . are connected in parallel with each other. In other words, there is employed a unit structure in which the resistor 9b for a current detection is connected to a circuit in which a plurality of light emitting elements 9a, 9a, . . . (two LEDs in this example) are connected in series. Referring to each light emitting unit 9, the resistor 9b for a current detection is connected to the cathode of the lowest LED and one of the ends thereof is grounded. Therefore, a current flowing to the LED is converted into a voltage by the resistor 9b and is thus detected. Moreover, the anode of the LED to be an element positioned on the high order side is connected to a terminal "TT2".

The breakage detecting section 5 is constituted as a detecting circuit provided for each light emitting unit and has the same circuit structure for each of the units (accordingly, only one unit will be described below).

The base of a PNP transistor 22 having a collector grounded is connected to the node of the light emitting element 9a and the resistor 9b for a current detection through a resistor 23, and the emitter of the transistor 22 is connected to a terminal for supplying the source voltage Vcc through a resistor 24. A resistor 25 is provided between the base and emitter of the transistor 22.

The emitters of the transistors 22 are connected to detecting terminals "D1" to "Dn" provided in a control IC 26 constituting the control section 6 ("n" indicates the total number of the light emitting units), respectively. In the case in which a breakage is generated in the light emitting element constituting a certain light emitting unit, the transistor 22 corresponding to the light emitting unit is turned ON so that an L (low) level signal is input to a detecting terminal connected to the emitter of the transistor 22 (an H (high) level signal is input during a non-breakage).

In the example, a CPLD ("Complexed Programmable Logic Device") is used for the control IC 26 and can rewrite an internal circuit. In other words, it is possible to carry out programming or reprogramming for the internal circuit which is mounted on a substrate, which is effective for shortening a development period and reducing a manufacturing cost. It is a matter of course that a microcomputer can be used for the control section 6. In such a configuration as to employ the CPLD, it is possible to obtain an advantage that a cost required for development equipment is reduced and an internal clock is not required (a cost required for a countermeasure against a noise can be reduced).

In the control IC 26, "O1", "O2" and "O3" indicated as output terminals have the following meaning.

"O1"=a control output signal for flashing a light emitting element in a predetermined cycle during a normal operation (at time of the detection of a non-breakage) (a binary signal indicative of an H level or an L level), "O2"=a control output signal for flashing a light emitting element (unbroken) at a high speed at time of the detection of the breakage (when the breakage state of at least a predetermined number of light emitting units is detected) (a binary signal indicative of an H level or an L level), and "O3"=an output signal (corresponding to the Sout) for sending, to a display section (a display lamp provided on an inner panel in a vehicle) which is not shown, a notice that at least one of the light emitting units is broken if any.

As described above, the presence of the generation of the breakage related to each light emitting unit can be detected as a binary state based on input signals sent from the detecting terminals D1 to Dn. Therefore, in the case in which the breakage of at least one of the light emitting units is detected, for example, the L level signal is input to any of the detecting terminals D1 to Dn and the signal O3 is sent to the display section to display a notice of the breakage (it is preferable that the display lamp should be driven by means of a transistor).

In the case in which the specific light amount of the lighting unit is defined to be 50% of an initial value, for example, the flashing cycle of the control output signal O2 is defined to be shorter than a flashing cycle obtained by the control output signal O1 when the control IC 26 detects that most of the light emitting units are broken (a high-speed flasher).

As shown, an output terminal related to the signal O1 is connected to the base of an NPN transistor 29 through a forward diode 27 and a resistor 28, and furthermore, an output terminal related to the signal O2 is connected to the base of the NPN transistor 29 through a forward diode 30 and the resistor 28. One of the ends of a resistor 31 is connected to the base of the transistor 29 having an emitter grounded, and the other end of the resistor 31 is grounded.

A PNP transistor 32 and a diode 33 are provided on a line connecting the terminals "TB" and "TT2". In other words, the transistor 32 has an emitter connected to the terminal TB, and a collector connected to the anode of the diode 33 and the cathode of the diode 33 is connected to the terminal TT2.

The base of the transistor 32 is connected to the collector of the transistor 29 through a resistor 34 and a resistor 35 is provided between the base and emitter of the transistor 32.

Accordingly, the ON/OFF state of the transistor 29 is defined corresponding to the level of the signal O1 or O2. As a result, the ON/OFF state of the transistor 32 is defined. If the transistor 32 is ON, the voltage "+B" is supplied from the terminal TB to the terminal TT2 through the diode 33.

A terminal "TT1" is connected to the collector of the transistor 32 and is used in the voltage converting and voltage detecting section 8 which will be described below.

Figure 5:
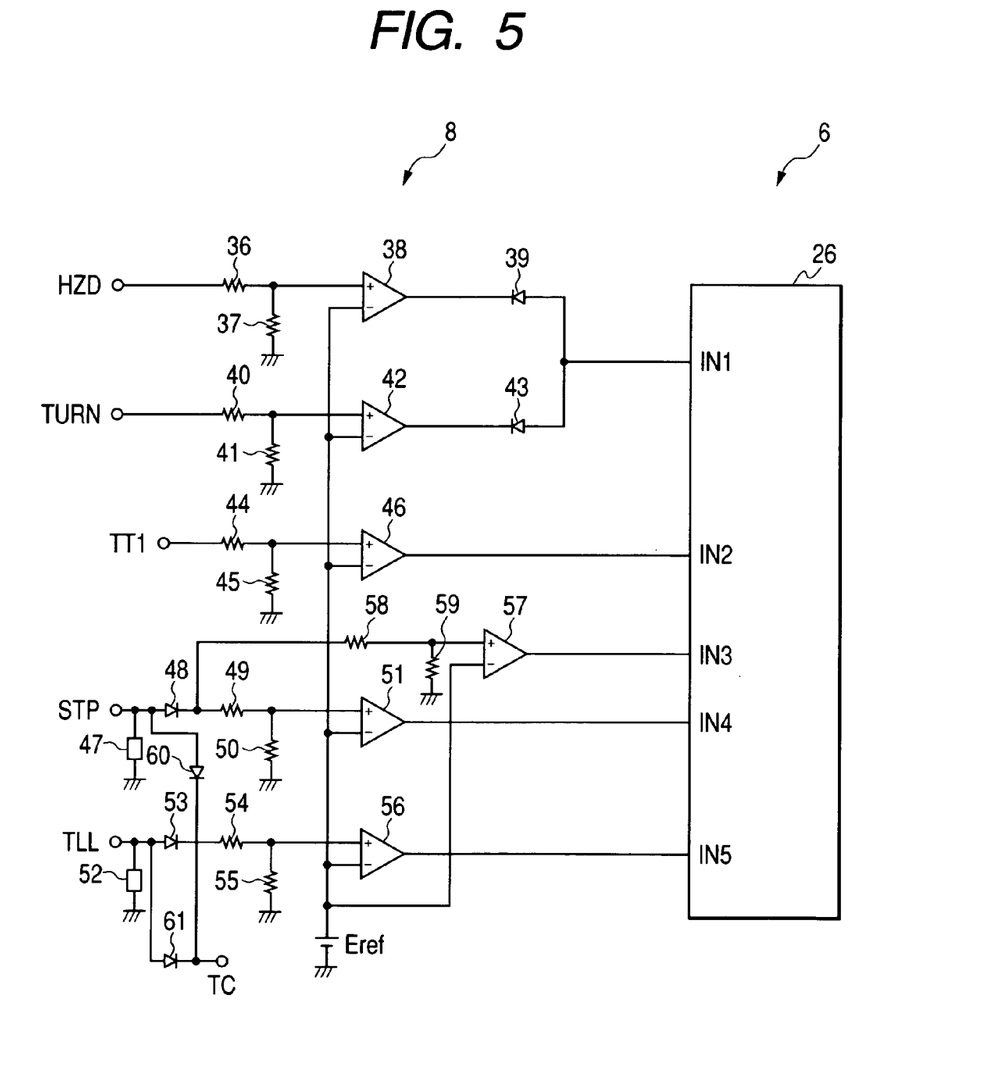
FIG. 5 is a circuit diagram showing an example of a structure related to a voltage converting and voltage detecting section.

FIG. 5 shows an example of the structures of the voltage converting and voltage detecting section 8 and the control section 6 related thereto.

First of all, the HZD is supplied to the positive input terminal of a comparator 38 through voltage dividing resistors 36 and 37. A predetermined reference voltage "Eref" (indicated as a symbol of a constant voltage source in the drawing) generated based on the source voltage Vcc is supplied to the negative input terminal of the comparator 38. Moreover, the output terminal of the comparator 38 is connected to the cathode of a diode 39 and the anode of the diode 39 is connected to an input terminal "IN1" of the control IC 26.

Furthermore, the TURN is supplied to the positive input terminal of a comparator 42 through voltage dividing resistors 40 and 41. The reference voltage Eref is supplied to the negative input terminal of the comparator 42. The output terminal of the comparator 42 is connected to the cathode of a diode 43 and the anode of the diode 43 is connected to the input terminal "IN1" of the control IC 26.

Each of the input signals HZD and TURN has a specification of L (low) active (for example, an ON state is brought at 6V or less).

The terminal TT1 is connected to the positive input terminal of a comparator 46 through voltage dividing resistors 44 and 45. The reference voltage Eref is supplied to the negative input terminal of the comparator 46 and the output terminal of the comparator 46 is connected to an input terminal "IN2" of the control IC 26. In the case in which a resistor voltage dividing value of a voltage applied to the terminal TT1 is greater than the Eref, accordingly, a signal having the H level is sent to the input terminal "IN2". In other words, the signal indicates a validity related to the detection of a breakage. If the signal has the L level, a source voltage is not applied from the terminal TT2 to the light emitting element or a source voltage value has a necessary level or less. Consequently, the detection of the breakage is invalidated. The reason is as follows. When the signal TURN has the L level (an extinction period in a flashing instruction), the L level is input to the detecting terminals D1 to Dn even if the light emitting element is not broken. Therefore, it is necessary to prevent an erroneous decision from being made.

A varistor 47 is provided for the signal STP, and the signal STP is supplied to the positive input terminal of a comparator 51 through a forward diode 48 and voltage dividing resistors 49 and 50. The reference voltage Eref is supplied to the negative input terminal of the comparator 51 and the output terminal of the comparator 51 is connected to an input terminal "IN4" of the control IC 26.

Moreover, a varistor 52 is provided for the signal TLL, and the signal TLL is supplied to the positive input terminal of a comparator 56 through a forward diode 53 and voltage dividing resistors 54 and 55. The reference voltage Eref is supplied to the negative input terminal of the comparator 56 and the output terminal of the comparator 56 is connected to an input terminal "IN5" of the control IC 26.

Each of the input signals STP and TLL has a specification of H (high) active (for example, an ON state is brought at 6V or more).

A comparator 57 is provided for detecting the overvoltage input of the STP and a detected voltage is supplied from the diode 48 to the positive input terminal of the comparator 57 through voltage dividing resistors 58 and 59 connected to the cathode of the diode 48. The reference voltage Eref is supplied to the negative input terminal of the comparator 57 and the output terminal of the comparator 57 is connected to an input terminal "IN3" of the control IC 26. In the case in which the resistor voltage dividing value of the input voltage of the STP is greater than the Eref, accordingly, an H level signal sent from the comparator 57 is input to the input terminal "IN3".

A voltage to be supplied to each comparator (a source voltage based on the Vcc) and a pull-up resistance are not shown in the drawing.

A terminal "TC" is connected to each of the input terminals of the STP and TLL through diodes 60 and 61, respectively. In other words, the anode of the diode 60 is connected to the anode of the diode 48, the anode of the diode 61 is connected to the anode of the diode 53, and the cathodes of the diodes 60 and 61 are connected to each other and are connected to the terminal "TC". The terminal TC is a terminal for supplying a voltage to a tail and stop lamp section which will be described below.

Figure 6:
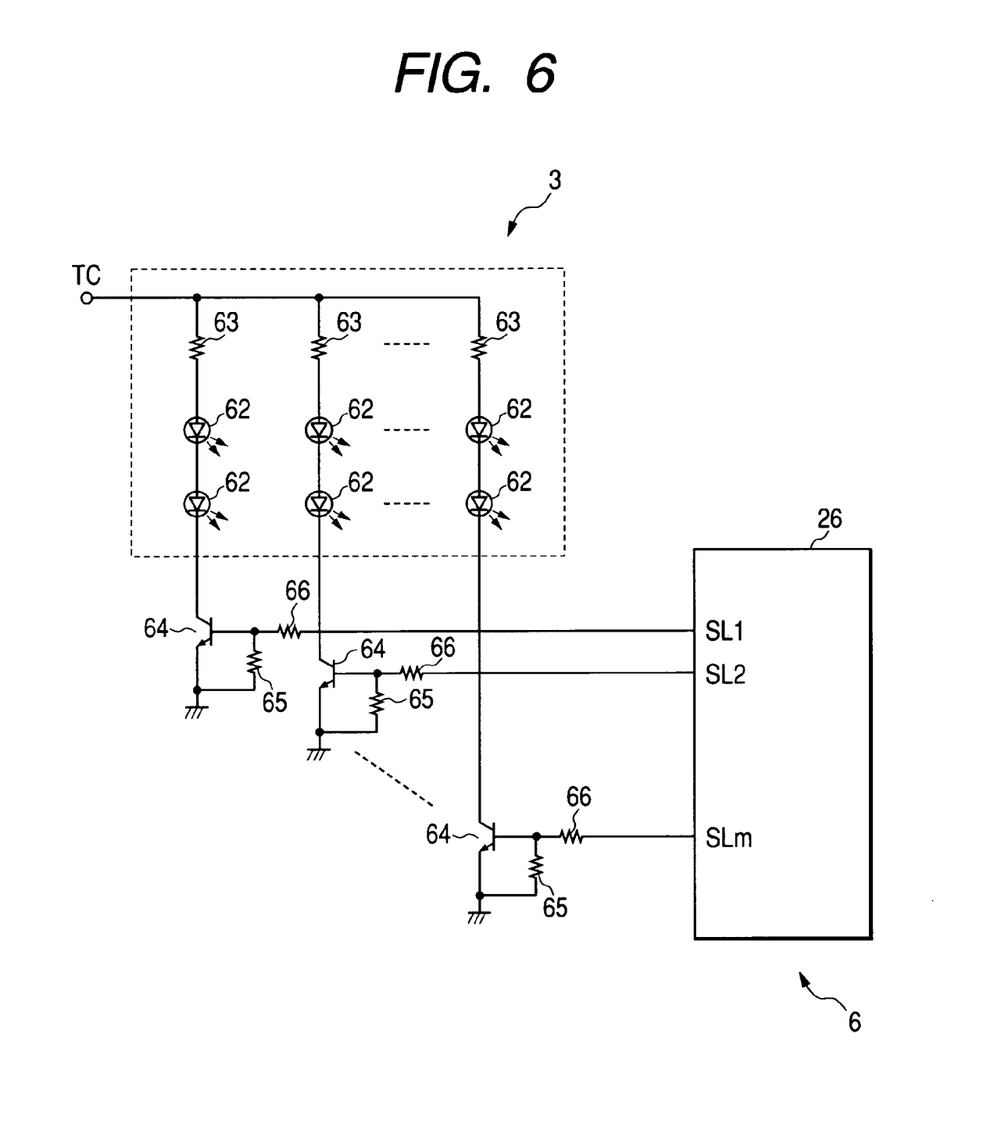
FIG. 6 is a circuit diagram showing an example of a structure related to a tail and stop lamp section.

FIG. 6 shows an example of the structures of the tail and stop lamp section 3 and the control section 6 related thereto.

The tail and stop lamp section 3 has a structure in which a light emitting unit having a plurality of light emitting elements 62, 62, . . . (two LEDs in the example) and a current limiting resistor 63 connected in series is set to be a unit structure and a plurality of units are connected in parallel with each other. In other words, in the example, the two LEDs are connected in series and the current limiting resistor 63 is connected to the LED on the high order side.

One of the ends of the resistor 63 is connected to the terminal TC and the other end of the resistor 63 is connected to the LED, and the other end of the LED is connected to the collector of an NPN transistor 64 through another LED.

Each of the transistors 64, 64, . . . constitutes a circuit for driving the LED which is provided for each light emitting unit, and the circuit has the same structure for each of the light emitting units.

The collector of the NPN transistor 64 having an emitter grounded is connected to the cathode of the LED on the low order side constituting the light emitting unit and a resistor 65 is provided between the base and emitter of the transistor 64.

Each of the bases of the transistors 64 is connected to each of control output terminals "SL1" to "SLm" ("m" indicates the total number of the light emitting units) provided in the control IC 26 through a resistor 66 and the ON/OFF state of each transistor is defined in response to a control signal sent from each output terminal to each transistor 64.

In other words, the two LEDs constituting the light emitting units are driven by a transistor. A chopper control method is employed in such a manner that the duty cycle of a control signal output from each of the control output terminals SL1 to SLm is set to be 100% when the stop lamp is ON and is set to be 10 to 15% when the tail lamp is ON, and both of the lamps can be thus switched by a change in the duty cycle, for example. Moreover, if a current flowing to the LED is small, a variation related to the luminous flux-current characteristic of the LED is increased. Consequently, there is a possibility that the unevenness of the amount of light might be generated when the tail lamp is ON. By employing the chopper control, it is possible to eliminate such a drawback.

In the case in which an overvoltage input (for example, 16V or more) for the STP is detected by the comparator 57, the duty cycle of a control signal in the ON state of the stop lamp is reduced to approximately 50%.

An algorithm related to the detection of a breakage in the structure is collectively itemized as follows (Attention is to be paid to the fact that the input signals related to the detecting terminals D1 to Dn of the control IC 26 indicate the L level at time of the breakage).

(i) In the case in which the input signal related to the input terminal "IN2" of the control IC 26 has the L level, a voltage is not supplied to each light emitting element constituting the light emitting unit of the turn signal lamp section 2. Even if the input signals related to the detecting terminals D1 to Dn of the control IC 26 have the L level, therefore, the breakage is not detected (in order to prevent a malfunction).

(ii) In the case in which the input signal related to the input terminal "IN2" of the control IC 26 has the H level and all the input signals related to the detecting terminals D1 to Dn have the H level, it is decided that the breakage is not generated (a normal state).

(iii) In the case in which the input signal related to the input terminal "IN2" of the control IC 26 has the H level and any of the input signals related to the detecting terminals D1 to Dn has the L level, the decision is made in accordance with the following standards.

(iii-1) In the case in which the number of the broken light emitting units is smaller than a predetermined number, the generation of the breakage by the signal O3 is displayed.

(iii-2) In the case in which the number of the broken light emitting units is equal to or greater than the predetermined number, an alarm is given through high-speed flashing in response to the signal O2.

For example, assuming that the number of the light emitting units is set to be eight, a predetermined clock signal is input to a CPLD or a PLD ("Programmable Logic Device") and a state machine (the control IC 26) comprises 16 states, whether the input signal to be sent to each of detecting terminals D1 to D8 has the H level or the L level is stored for each state. In the case in which an element constituting a certain light emitting unit is broken so that the input signal to be sent to the detecting terminal corresponding to the light emitting unit has the L level, the breakage of one circuit (one light emitting unit) is detected. Accordingly, the breakage is simply displayed in case of the (iii-1), and an alarm is given in a high-speed flasher (a flashing frequency is doubled) in case of the (iii-2), for example, in the case in which at least five of the eight units are broken.

In order to reduce an erroneous detection caused by a noise, it is preferable that a design should be carried out to start the decision of the breakage in a next state when a state in which at least one of the detecting terminals D1 to Dn has the L level is detected continuously over a predetermined number of states or more (for example, five states). Consequently, the reliability of the detection can be enhanced.

In the case in which the breakage of at least a predetermined number of light emitting units is detected in one lighting unit, it is also possible to stop the supply of a power to the lighting unit including a light emitting unit having the breakage detected. For example, in the case in which it is supposed that one lighting unit is constituted by the light emitting units shown in FIG. 4, it is preferable that both of the levels of the signals O1 and O2 should be defined to have the L level and the transistors 29 and 32 should be turned OFF to block power supply to each light emitting unit (a lighting unit in which the breakage is not detected is processed in accordance with the (iii-2)).

Referring to the control circuit (the ECU) of the lighting unit using the light emitting element such as the LED, a method utilizing a microcomputer is generally employed. In the configuration using the CPLD or the PLD, it is easy to control and change a lighting or flashing pattern related to the light emitting element and to control a lighting order. Moreover, it is possible to easily constitute a system by simply providing a power circuit. Thus, the circuit scale of the whole system can be reduced so that the size and cost of the lighting device can be reduced effectively.

As is apparent from the above description, according to the first aspect of the invention, attention of a vehicle driver can be called to the broken light emitting unit at an early stage, and furthermore, an alarm indicative of the generation of an abnormality can be given as a whole lamp when at least a predetermined number of light emitting units are broken. Accordingly, it is possible to realize the compatibility of the early detection of a breakage and the maintenance of a lamp function utilizing an unbroken light emitting element.

According to the second aspect of the invention, in the case in which a small number of light emitting units are broken and a necessary specific light amount (a light amount to satisfy the regulations) can be maintained, the generation of the breakage of the whole lamp is not decided so that the light emitting unit can be turned ON or flashed as continuously as possible. Moreover, it is possible to reduce a frequency in the generation of an erroneous detection.

What is claimed is:

1. A lighting device for a vehicle comprising:
   a lighting unit in which a plurality of light emitting elements make a set to constitute a light emitting unit and the light emitting units are connected in parallel with each other;
   first breakage detecting means for detecting a breakage of the light emitting element constituting the light emitting unit for each of the light emitting units;
   second breakage detecting means for detecting whether a breakage of at least a predetermined number of light emitting units is generated or not; and
   control means for displaying generation of a breakage related to the light emitting unit when the breakage of the light emitting element constituting the light emitting unit is detected by the first breakage detecting means, and for flashing a light emitting unit in which the breakage is not detected or a lighting unit including only the light emitting unit in a shorter flashing cycle than a flashing cycle obtained before the detection of the breakage when the generation of the breakage of the at least a predetermined number of light emitting units is detected by the second breakage detecting means.

2. The lighting device for a vehicle according to claim 1, wherein supply of a power to a lighting unit including the light emitting unit having the breakage detected is stopped by the control means when the breakage of the at least a predetermined number of light emitting units is detected by the second breakage detecting means.

3. The lighting device for a vehicle according to claim 1, wherein said first breakage detecting means detects that a current does not flow to the light emitting element constituting the light emitting unit or a current value is decreased.

4. The lighting device for a vehicle according to claim 1, wherein said second breakage detecting means calculates a number of the broken light emitting units based on detection result of said first breakage detecting means.

5. The lighting device for a vehicle according to claim 1, wherein said second breakage detecting means detects a number of the broken light emitting units based on a total value of currents flowing to each light emitting elements.

6. A lighting device for a vehicle comprising:
   a lighting unit in which a plurality of light emitting elements make a set to constitute a light emitting unit and the light emitting units are connected in parallel with each other;
   first breakage detecting means for detecting a breakage of the light emitting element constituting the light emitting unit for each of the light emitting units;
   second breakage detecting means for detecting whether a breakage of at least a predetermined number of light emitting units is generated or not; and
   control means for notifying generation of a breakage related to the light emitting unit when the breakage of the light emitting element constituting the light emitting unit is detected by the first breakage detecting means, and for notifying the generation of the breakage of the at least a predetermined number of light emitting units detected by the second breakage detecting means.

* * * * *